(12) United States Patent
Tzidon et al.

(10) Patent No.: US 10,090,569 B2
(45) Date of Patent: Oct. 2, 2018

(54) THERMAL BATTERY FOR HEATING VEHICLES

(71) Applicant: PHINERGY LTD., Lod (IL)

(72) Inventors: Aviv Tzidon, Tel Aviv (IL); Avraham Yadgar, Kiryat Ono (IL)

(73) Assignee: PHINERGY LTD., Lod (IL)

( * ) Notice: Subject to any disclaimer, the term of this patent is extended or adjusted under 35 U.S.C. 154(b) by 0 days.

(21) Appl. No.: 15/115,673

(22) PCT Filed: Feb. 3, 2015

(86) PCT No.: PCT/IL2015/050117
§ 371 (c)(1),
(2) Date: Jul. 31, 2016

(87) PCT Pub. No.: WO2015/114637
PCT Pub. Date: Aug. 6, 2015

(65) Prior Publication Data
US 2016/0344082 A1 Nov. 24, 2016

Related U.S. Application Data

(60) Provisional application No. 61/934,887, filed on Feb. 3, 2014, provisional application No. 61/948,080, filed on Mar. 5, 2014.

(51) Int. Cl.
*H02J 7/00* (2006.01)
*H01M 16/00* (2006.01)
(Continued)

(52) U.S. Cl.
CPC ............ *H01M 16/00* (2013.01); *B60H 1/143* (2013.01); *B60L 11/1816* (2013.01);
(Continued)

(58) Field of Classification Search
CPC ... Y02T 10/7005; Y02T 90/14; Y02T 10/705; Y02T 10/7088; Y02E 60/12
(Continued)

(56) References Cited

U.S. PATENT DOCUMENTS 4,081,693 A 3/1978 Stone
4,650,729 A * 3/1987 Nakamura ............... H01M 4/96
429/120
(Continued)

FOREIGN PATENT DOCUMENTS

DE 2010039028 2/2012
JP H6-243901 9/1994
(Continued)

OTHER PUBLICATIONS

International Search Report of International Application No. PCT/IL2015/050117 dated Jun. 3, 2015.
(Continued)

*Primary Examiner* — Arun Williams
(74) *Attorney, Agent, or Firm* — Pearl Cohen Zedek Latzer Baratz LLP

(57) ABSTRACT

A system and a method for heating a component of an electric vehicle may be particularly beneficial in cold weather places and/or during winter time. The vehicle may be primarily powered by a main battery. The system may include a supplementary battery being metal-air battery including an electrolyte, for extending the driving range of the electric vehicle and a reservoir tank for holding an electrolyte volume for the metal-air battery, the electrolyte may be heated to a desired temperature. The system may further include a heat exchanger for conveying heat from the electrolyte volume, said heat is conveyable to said passenger's cabin.

18 Claims, 2 Drawing Sheets

(51) Int. Cl.
| | |
|---|---|
| *B60N 2/56* | (2006.01) |
| *H01M 12/06* | (2006.01) |
| *H01M 10/615* | (2014.01) |
| *B60L 11/18* | (2006.01) |
| *F28D 15/00* | (2006.01) |
| *F28D 20/00* | (2006.01) |
| *H01M 10/657* | (2014.01) |
| *B60H 1/14* | (2006.01) |
| *H01M 10/44* | (2006.01) |
| *H01M 10/46* | (2006.01) |
| *H01M 10/625* | (2014.01) |
| *F28D 21/00* | (2006.01) |
| *H01M 6/50* | (2006.01) |

(52) U.S. Cl.
CPC ....... *B60L 11/1822* (2013.01); *B60L 11/1853* (2013.01); *B60L 11/1861* (2013.01); *B60L 11/1864* (2013.01); *B60L 11/1875* (2013.01); *B60L 11/1879* (2013.01); *B60N 2/56* (2013.01); *F28D 15/00* (2013.01); *F28D 20/0034* (2013.01); *H01M 6/50* (2013.01); *H01M 10/44* (2013.01); *H01M 10/46* (2013.01); *H01M 10/615* (2015.04); *H01M 10/625* (2015.04); *H01M 10/657* (2015.04); *H01M 12/06* (2013.01); *H02J 7/0054* (2013.01); *B60L 2240/34* (2013.01); *B60L 2240/545* (2013.01); *B60L 2260/56* (2013.01); *B60L 2270/44* (2013.01); *F28D 2021/008* (2013.01); *F28D 2021/0028* (2013.01); *H01M 6/5077* (2013.01); *H01M 2220/20* (2013.01); *Y02E 60/142* (2013.01); *Y02T 10/7005* (2013.01); *Y02T 10/7044* (2013.01); *Y02T 10/7061* (2013.01); *Y02T 10/7072* (2013.01); *Y02T 90/124* (2013.01); *Y02T 90/14* (2013.01)

(58) Field of Classification Search
USPC .......................................................... 320/104
See application file for complete search history.

(56) References Cited

U.S. PATENT DOCUMENTS

| | | | | |
|---|---|---|---|---|
| 5,304,430 | A * | 4/1994 | Ludwig | B60L 11/1879 429/408 |
| 5,543,243 | A * | 8/1996 | Brecht | H01M 2/38 429/51 |
| 5,947,375 | A * | 9/1999 | Yamano | B60H 1/00392 237/12.3 B |
| 7,940,028 | B1 | 5/2011 | Hermann | |
| 8,190,320 | B2 | 5/2012 | Kelty et al. | |
| 8,298,692 | B2 | 10/2012 | Hermann | |
| 8,557,414 | B2 | 10/2013 | Hermann et al. | |
| 2003/0134167 | A1* | 7/2003 | Hirakata | B60K 1/04 429/432 |
| 2004/0005488 | A1* | 1/2004 | Faris | H01M 10/42 429/404 |
| 2004/0048133 | A1* | 3/2004 | Faris | H01M 6/5011 429/404 |
| 2005/0236376 | A1* | 10/2005 | Eccles | G21B 3/00 219/121.36 |
| 2011/0223450 | A1 | 9/2011 | Horne | |
| 2012/0041628 | A1 | 2/2012 | Hermann | |
| 2013/0084474 | A1* | 4/2013 | Mills | H01M 4/9016 429/9 |

FOREIGN PATENT DOCUMENTS

| | | |
|---|---|---|
| JP | H10-014013 | 1/1998 |
| JP | 2008-120244 | 5/2008 |
| WO | WO 2014009951 | 3/2014 |

OTHER PUBLICATIONS

Partial Search Report of Application No. EP 15743478 dated Oct. 16, 2017.
Office Action of JP Patent Application No. 2016-549100 dated Jul. 10, 2018.

* cited by examiner

THERMAL BATTERY FOR HEATING VEHICLES

CROSS-REFERENCE TO RELATED APPLICATIONS

This application is a National Phase Application of PCT International Application No. PCT/IL2015/050117, International Filing Date Feb. 3, 2015, entitled "Thermal Battery for Heating Vehicles", published on Aug. 6, 2015 as International Patent Application Publication No. WO 2015/114637, claiming priority of U.S. Provisional Patent Application No. 61/934,887, filed Feb. 3, 2014, and U.S. Provisional Patent Application No. 61/948,080, filed Mar. 5, 2014, both of which are incorporated herein by reference in their entireties.

BACKGROUND

Heating electric vehicles using a conventional air-conditioning system, in particular at colder places, consumes large amount of the electric power stored in the vehicle's main battery, thus will probably reduce the traveling range of the vehicles. In a vehicle powered by an internal combustion engines, heat produced during the combustion is used to heat other components of the vehicle, such as the passenger's cabin or the driver's seat. This option of using excess thermal energy from the vehicle's motor does not exist in electric vehicles.

Metal-Air electrical cells are known in the art. Such Metal-Air cell or battery includes a metal anode, including for example, aluminum, zinc, lithium, beryllium, calcium, or the like and a gas diffusion cathode. The chemical reaction that produces electricity in the battery is oxidation of the metal anode in the presence of either aqueous or non-aqueous electrolyte. The electrolyte is used for transferring ions between the cathode and anode. In some cases, the electrolyte may also be used for washing away the products of the reaction (i.e., the metal's oxides) which coat the anode, thus allowing the oxidation reaction of the anode to continue and the battery to supply electricity.

Metal-air batteries have potentially high capacity, which make them attractive for use in electric vehicles. However, metal-air batteries known in the art still lack sufficient power to operate as a sole power supplier to electric vehicles.

Conventional batteries used in electric vehicles, for example, lithium based batteries, are large, expensive and have a limited energy source that needs to be recharged regularly, thus limiting the traveling range of the electric vehicles. At optimum driving conditions and without using the electric energy stored in the lithium based battery for any purposes other than driving the car, the maximum traveling range of the Tesla Roadster® was 394 km per charge, using a relatively large and very expensive lithium based battery. Any use of the electricity stored in the battery for heating or cooling the vehicle's passenger cabin, will reduce the traveling range dramatically.

A metal-air battery may be combined with a conventional lithium based battery to extend the traveling range of the electric vehicle when in need (acting like a reserve energy unit). Such a metal-air battery may include a tank for holding a reservoir of electrolyte for circulating the electrolyte in the battery, thereby slowing down the electrolyte's degradation.

SUMMARY OF THE INVENTION

Some embodiments of the invention may be related to a system and a method for heating a passengers' cabin in an electric vehicle, wherein the vehicle may be primarily powered by a main battery. The system may include a supplementary battery being metal-air battery including an electrolyte, for extending the travel range of the electric vehicle and a reservoir tank for holding an electrolyte volume for the metal-air battery, the electrolyte may be heated to a desired temperature. The system may further include a heat exchanger for conveying heat from the electrolyte volume, said heat is conveyable to said passenger's cabin.

Some additional aspects of the invention may be related to a system and method for heating components in electric vehicles. The electric vehicle is being powered by a main battery. The system may include a tank for holding heat accumulating liquid volume, the heat accumulating liquid may be heatable to a desired temperature, for example, 30-130° C. or 55-95° C., and a heat exchanger for conveying heat from the heat accumulating liquid, the heat may be conveyable to said components in said electric vehicle.

A tank holding heated heat accumulating liquid may be used as a thermal battery for holding reservoir of heat. The heat accumulating liquid may be heated during non-traveling periods of the vehicle (e.g., parking at the owner's garage and/or parking in public parking places) by, for example, plugging a heating element, installed at or proximal to the tank, to the city grid for heating the heat accumulating liquid. Additionally or alternatively, the tank may be filled/refilled with heated heat accumulating liquid from reservoirs of heated heat accumulating liquid, for example, in a gasoline/service station or at a public parking place, in order to enable fast loading of heat energy into the tank.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
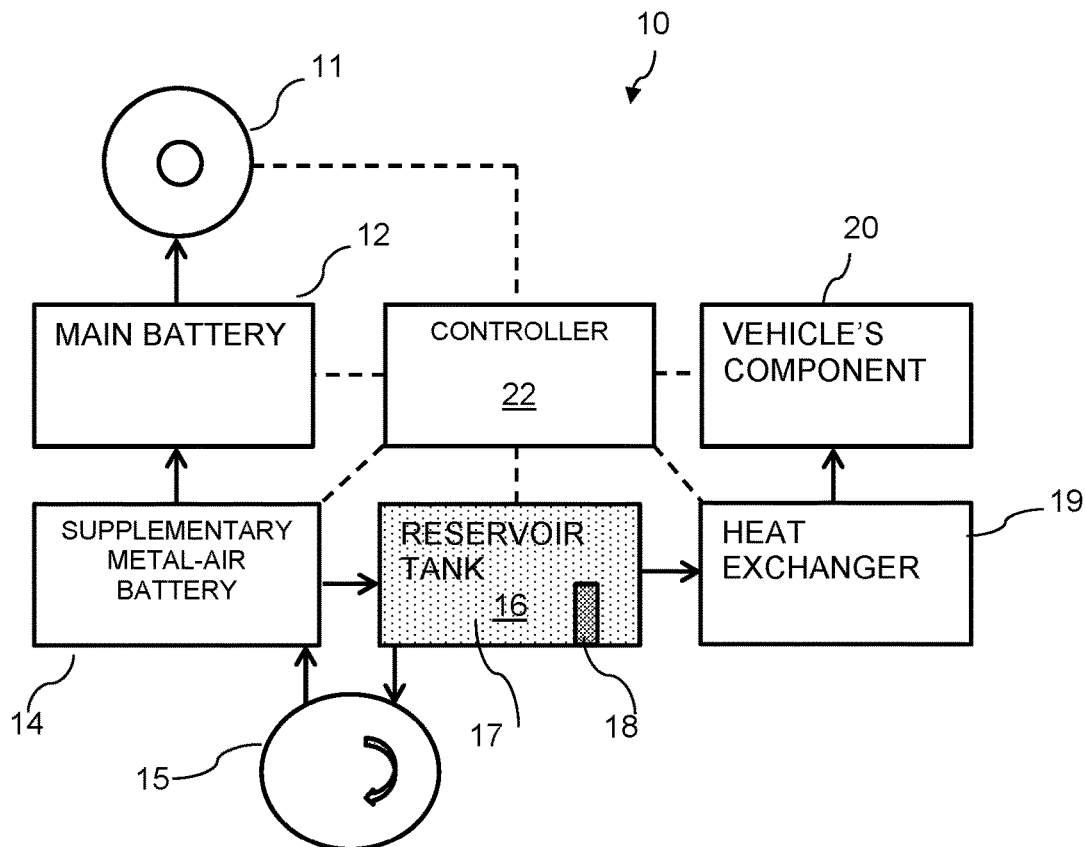
FIG. 1A is a schematic block diagram of a system for heating a component of an electric vehicle according to some embodiments of the present invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

One known source of electric power for an electric vehicle is a lithium-based battery, which has many benefits. Yet, the specific cost of a residual energy unit (e.g., KWh) stored in a lithium-based battery is relatively high. Some aspects of the invention may be related to a system for extending the traveling range of an electric vehicle (e.g., an electric car) by adding a supplementary, metal-air, battery having a relatively low specific cost of energy unit, to an (existing) main rechargeable lithium-based battery.

The metal-air battery may be used for recharging the main battery when needed, for example during traveling, when the capacity of the main battery drops below a predetermined threshold value; for example, bellow 70% of its full capacity. This arrangement may allow to use a relatively smaller and less expensive main rechargeable batteries, to fully power the vehicle during an average day-to-day travel need, for example, a 60 Km drive range between one recharging point, e.g. a user's home to the next recharging location, e.g., his/hers working place. When a longer traveling range is required the supplementary metal-air battery may be used to recharge the main rechargeable battery during the voyage. A first portion of the voyage may be powered solely by the main rechargeable battery until the capacity of the main battery drops below a predetermined threshold value, and then the supplementary metal-air battery may be activated to recharge the main battery, in a second portion of the voyage. In non-limiting exemplary embodiment, in a first 60 KM of the travel, the vehicle's electric motor may be powered solely by a main lithium based battery, and in an additional 300 KM, the electric motor may be powered from the lithium battery as the lithium based battery is recharged, during voyage, by a supplementary aluminum-air battery.

A reservoir tank for holding electrolyte volume may be assembled in the electric vehicle, for supplying electrolyte to the metal-air battery. A pump for circulating the electrolyte between the reservoir tank and the metal-air battery cell may also be assembled in the electric vehicle. In some embodiments, the volume of the electrolyte in the tank may be in the range of 10-1000 liters, for example, 20-50 liters for small electric car or 50-250 for an electric bus, electric boat or larger vehicles, such as ships, airplanes or the like.

This electrolyte volume may be used as a thermal battery for preserving heat, for example, for heating the vehicles' passenger cabin or other components of the electric vehicle such as the driver's seat or the main battery (e.g., the lithium battery). The electrolyte in the tank may be pre-heated (e.g., before the vehicle is started, when parked, etc.) by a heating element powered by an external electric source, for example, the city electricity grid. The city electricity grid is the cheapest among the three electric sources—lithium-based battery, metal-air battery and grid power. The heating element may be located anywhere in or near the electrolyte piping system for example in or near the reservoir tank. Additionally or alternatively, the electrolyte may be heated during the operation of the metal-air battery due to the exothermic reaction taking place on the surface of the metal anode in the metal-air battery. The heat from the oxidation of the anode is transferred into the electrolyte. As the reaction proceeds, the temperature of the electrolyte increases, and there may be a need to evacuate the heat from the electrolyte in order to keep the electrolyte, and thus the metal air battery, in working temperature range.

The pre-heated electrolyte may allow a better operation of the metal-air battery. The metal air battery may operate at optimal conditions when the electrolyte in the battery has a temperature between 30-100° C. In conventional operation of metal-air batteries, an exothermic reaction that occurs in the battery functions as the heat source, heating the electrolyte to the optimal temperatures. This process, however, may require some time and may decrease the ability of the battery to generate a required amount of power at the beginning of the battery operation, before it reaches optimal temperature. Therefore, in some embodiments, pre-heating the electrolyte in the reservoir to a desired temperature prior to the introduction of the electrolyte to the battery may result in allowing the air-metal battery to start working in optimal condition.

The heat from the heated electrolyte may be used in certain uses requiring heat-source. For example, heat from the heated electrolyte (e.g., excess heat) may be conveyed via a heat exchanger to the passenger's cabin to heat the cabin. This process may be particularly beneficial in cold weather places and/or during winter time, for example, in Northern Europe, North America, Japan, or the like. In conventional electric vehicles, the main electrical energy source (e.g., a lithium battery), which is comparatively rather expensive, is used for both traveling and cabin comfort (e.g., heat). Thus using the heat energy from the heated electrolyte, according to some embodiments of the invention, may save energy provided by the main energy source for traveling range.

In additional or alternative embodiments, the passengers' cabin or other components of the electric car may be heated using a system that includes a tank for holding heat accumulating liquid. Heat accumulating liquid may be any liquid that is capable of holding and preserving heat at a desired temperature, for example, water, mineral oils, solutions such as potassium hydroxide and sodium hydroide. The heat accumulating liquid may be heated inside the holding tank, for example, by a heating element located in the tank and powered by an external power source, for example, an electric grid. Additionally or alternatively, the tank may be filled with a heated heat accumulating liquid from a heated reservoir external to the vehicle, for example, a heated reservoir located at a service station. The heat from the heated heat accumulating liquid may be evacuated and conveyed to a component of the electric vehicle using a heat exchanger.

Reference is made to FIG. 1A, which is a schematic block diagram of system 10 for heating a component in an electric vehicle, for example, a passengers' cabin in an electric vehicle, according to some embodiments of the present invention. System 10 may provide heat to heat component 20 (e.g., a passengers' cabin) located in the electric vehicle. System 10 may comprise electric motor 11, main rechargeable battery 12 for primarily powering the electric vehicle, supplementary metal-air battery 14, reservoir tank 16 for holding electrolyte volume 17, and heat exchanger 19. Electrolyte 17 may be circulated between supplementary battery 14 and reservoir tank 16 by pump 15. In some embodiments, reservoir tank 16 may include a heating element 18 for heating electrolyte 17 in tank 16.

Main battery 12 may be any commercial rechargeable battery suitable for use in an electric vehicle. Main battery 12 may have enough power and enough power operating flexibility so as to provide a varying power buffer according to a the travel varying demand. For example, main battery 12 may be a lithium based battery (e.g., lithium-ion, lithium iron phosphate or lithium-titanate), lead acid battery, nickel metal hydride (NiMH) battery, nickel iron battery or the like.

Supplementary metal-air battery 14 may be electrically coupled to main battery 12 and may be activated to recharge main battery 12 during voyage of the electric vehicle, when the capacity of main battery 12 is below a predetermined threshold value, for example, below 70% of battery 12 full capacity. Supplementary metal-air battery 14 may include a metal anode made of one or more materials including, for example, aluminum, zinc, lithium, beryllium, calcium, or the like. Supplementary metal-air battery 14 may further include an air cathode that supplies oxygen from the surrounding air via a membrane (e.g., carbon membrane) that allows the oxygen to enter the cell. The battery further includes electrolyte that may be in a liquid phase or as a gel. An aqueous electrolyte may include salts such as KOH or NaOH having good ionic conductivity in an aqueous solution and forming an alkali solution.

Reservoir tank 16 may be any tank configured to hold, for example, 10-1000 liters of electrolyte 17. In some embodiments, pump 15 may circulate electrolyte 17 between reservoir tank 16 and supplementary air-metal battery 14. The circulation may be done to decrease the degradation of the electrolyte in supplementary air-metal battery 14 during the activation and operation of the battery. The electrolyte degradation is due to solid metal-oxide particles and metal hydroxide ions formed of the surface of the metallic anode during the oxidation reaction and solute into the electrolyte. During the operation of air-metal battery 14, the oxidation reaction of the anode may form heat (i.e., the reaction is an exothermic reaction). The circulation of electrolyte 17 may allow conveying the heat away from the surface of the anode, thus allowing maintaining working operation conditions. In some embodiments, tank 16 may be insulated from its surroundings.

Working operation conditions of supplementary air-metal battery 14, according to some embodiments of the invention, may depend on the temperature. For example, for an aluminum-air battery, the working temperature range is between 10-100° C. and, for example, 40-90° C. An aluminum air cell normally operates at a voltage of 0.9-1.3 volts. For a given temperature, increasing current draw decreases cell voltage and increases corrosion, and decreasing current draw increases voltage and increases corrosion.

In some embodiments, reservoir tank 16 may be used as a thermal battery for storing heat in electrolyte 17. Electrolyte 17 may be heated to a desired temperature, for example, above 55° C. Tank 16 may further include at least one heating element 18 located inside tank 16 (as illustrated), at the vicinity of tank 16 and/or near a piping system adapted for circulating the electrolyte, for heating electrolyte 17, using an external electric source. Heating element 18 may be powered by an electric source external to metal air battery 14, for example, an electric source external to the electric vehicle. An example for an electric sources external to the metal air battery may be main battery 12 or an electric grid external to the electric vehicle. Heating element 18 may be powered and may heat electrolyte 17 during the recharging of the main battery 12 from the electric grid when the vehicle is parked. Additionally or alternatively, electrolyte 17 may be heated to the desired temperature due to the exothermic reaction that takes place in supplementary metal-air battery 14. In some embodiments, heating element 18 may heat electrolyte 17 to store heat energy in the electrolyte reservoir tank. In some embodiments, electrolyte 17 may be heated to a temperature value in the recommended temperature range supplementary.

Storing of heat energy that was supplied from the electricity grid for purposes such as heating the passenger's cabin is less expensive compared to heating the cabin by energy drawn from the main or supplementary batteries. This arrangement is especially suitable for vehicles used in cold places.

Additionally or alternatively, electrolyte 17 may be heated in a reservoir or tank located externally to the electric vehicle, for example, in a service station designated for filling heated electrolyte 17 into tank 16. In some embodiments, system 10 may include a replacement system (not illustrated) to replace the electrolyte when the temperature of the electrolyte 16 currently in the tank 17, drops below a predetermined threshold value, for example, below the temperature of the electrolyte of the service station or at any given time. The replacement system may be configured to connect to a connector included in the service station. The replacement system may include a pipe connecting resrviour 17 and a replacement connector to be connected to the service station connector. The electric vehicle may stop at the station, and the electrolyte currently in the tank may be replaced with new, fresh electrolyte already heated to the desired temperature.

The heat stored in electrolyte 17 may be conveyed from reservoir tank 16 to component 20 included in the electric vehicle, for example, passengers' cabin, by heat exchanger 19. Heat exchanger 19 may be any heat exchanger that is configured to convey heat from a heated liquid. For example, heat exchanger 19 may include two sets of pipes: a first set for heated electrolyte 17, and a second set holding a liquid to which the heat from electrolyte 17 is to be conveyed. The heat may be conveyable to the passenger's cabin or any other component 20 included in the electric vehicle that needs to be heated.

System 10 may further comprise controller 22 that may be in active communication with one or more of electric motor 11, main battery 12, supplementary battery 14, reservoir tank 16, pump 15, heat exchanger 19 and passenger's cabin 20. Controller 22 may receive signals indicative of the working status/condition of the respective unit. Controller 22 may be configured to process the received signals according to a program or programs that may be stored in a non-transitory memory connected with controller 22 (not shown) and may be executed to carry out methods and operations according to embodiments of the present invention. Controller 22 may further be equipped with or in active communication with in/out (I/O) interface unit (not shown) that may enable controller 22 to read received signals and to issue control commands. Controller 22 may be configured to control one or more of electric motor 11, main battery 12, supplementary battery 14, reservoir tank 16, heat exchanger 19, pump 15, and passenger's cabin 20 to operate according to embodiments of the present invention.

Figure 1B:
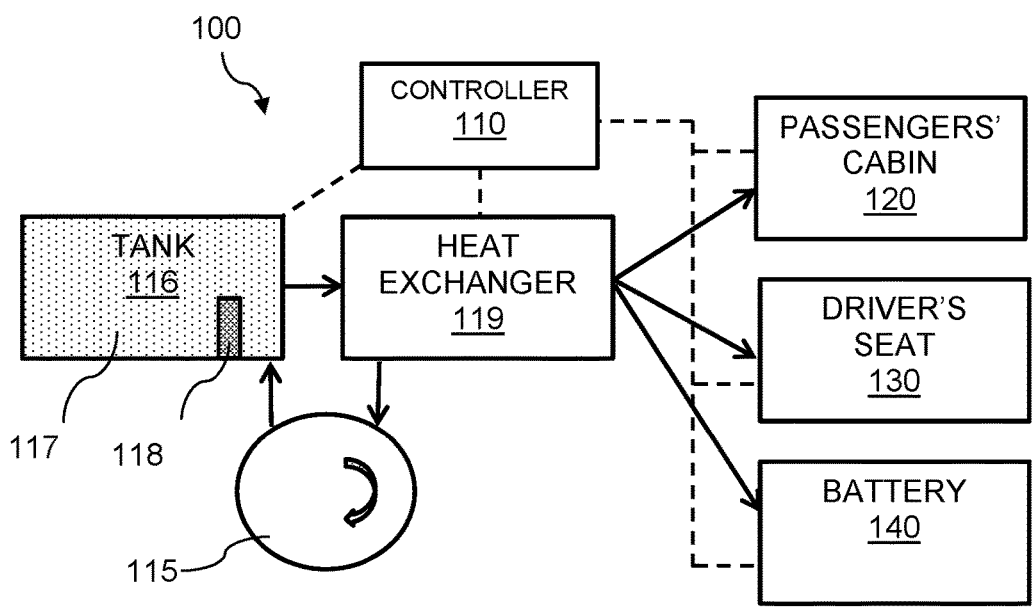
FIG. 1B is a schematic block diagram of a system for heating one or more components of an electric car according to some embodiments of the present invention.

Reference is made to FIG. 1B which is a schematic block diagram of a system 100 for heating one or more components of an electric vehicle according to some embodiments of the invention. System 100 may be assembled in the electric vehicle and may include a tank 116 for holding a heat accumulating liquid volume 117 and a heat exchanger 119 for conveying heat from heat accumulating liquid 117 to one or more components in said electric vehicle. The one or more components may be, for example, passengers' cabin 120, driver's seat 130 and/or a main battery 140 powering the electric vehicle. System 100 may further include a pump 115 for circulating heat accumulating liquid 117. In some embodiments, system 100 may further include heating element 118 for heating heat accumulating liquid 117.

Tank 116 may be any tank configured to hold liquids at a desired temperature, for example, at 55° C. Tank 116 may be insulated from its surroundings using any suitable insulating material. Tank 116 may be coated with insulating coating (e.g., a polymeric coating) or may be located inside an insulating housing for insulating the tank from the surroundings. The insulating housing may include an insulating material attached to the housing walls. Tank 116 inner walls may include or may be coated by a corrosion resistance material for protecting the inner portion of the tank from corrosion, due to the presence of heat accumulating liquid 117.

Heat accumulating liquid 117 may be any liquid configured to accumulate heat. Heat accumulating liquid 117 may be: an electrolyte usable in a metal-air battery, water or an aqueous solution, oil or oil based solution or any other liquid. Some exemplary heat accumulating liquids may include: Ethylen glycol, propylene glycol, diethyl glycol, Betaine, propane diol, perfluorpolyether, salts, ionic liquids, solid particles such as $TiO_2$, nano particles, $Al_2O_3$.

Tank 116 may include at least one heating element 118 located inside tank 116 (as illustrated), at the vicinity of tank 116 and/or near a piping system adapted for circulating heat accumulating liquid 117. For example, heating element 118 may be powered by an electric source external to the electric vehicle, for example from an electric grid. Heating element 118 may be powered and may heat electrolyte 117 during the recharging of main battery 140 from the electric grid, when the vehicle is parked. Additionally or alternatively, heat accumulating liquid 117 may be heated in a reservoir located externally to the electric vehicle, for example, in a service station designated for filling heat accumulating liquid 117 into tank 116. In some embodiments, the system may include a replacement system (not illustrated) to replace the heat accumulating liquid when the temperature of the heat accumulating liquid currently in the tank, drops below a predetermined threshold value, for example, below the temperature of the electrolyte of the service station or at any given time. The replacement system may be configured to connect to a connector included in the service station. The replacement system may include a pipe connecting tank 117 and a replacement connector to be connected to the service satation connector. The electric vehicle may stop at the station, and the heat accumulating liquid currently in the tank may be replaced with new, heat accumulating liquid already heated to a desired temperature.

The heat stored in heat accumulating liquid 117 may be evacuated from the liquid using heat exchanger 119. Heat exchanger 119 may be any heat exchanger that is configured to convey heat from a heated liquid. For example, heat exchanger 119 may include two sets of pipes: a first set for the heated heat accumulating liquid 117, and a second set holding a liquid to which the heat from heat accumulating liquid 117 is to be conveyed. In some embodiments, system 100 may include a pump 115 for circulating heat accumulating liquid 117 from tank 116 to heat exchanger 119.

Heat exchanger 119 may convey heat to at least one component included in the electric vehicle. For example, the heat may be conveyed to heat passengers' cabin 120 and/or driver's seat 130. In some embodiments, tank 116 may be located below driver's seat 130, conveying heat directly to seat 130. In some embodiments, the heat may be conveyed to heat main battery 140. Main battery 140 may be any commercial rechargeable battery suitable for use in an electric vehicle. Main battery 140 may have enough power and enough power operating flexibility so as to provide a varying power buffer according to a driver's demand. For example, main battery 140 may be lithium based battery (e.g., lithium-ion, lithium iron phosphate or lithium-titanate), lead acid battery, nickel metal hydride (NiMH) battery, nickel iron battery or the like. Main battery 140 may have an optimal working temperature range, for example, 30-100° C. for lithium based battery. The heat may be conveyed to heat main battery 140 to a temperature in the optimal working temperature range.

System 100 may further comprise controller 110 that may be in active communication with one or more of liquid tank 116, heat exchanger 119, passenger's cabin 120, driver's seat 130, pump 115, and main battery 140. Controller 110 may receive signals indicative of the working status/condition of the respective units. Controller 110 may be configured to process the received signals according to a program or programs that may be stored in a non-transitory memory connected with controller 110 (not shown) and may be executed to carry out methods and operations according to embodiments of the present invention. Controller 110 may further be equipped with or in active communication with in/out (I/O) interface unit (not shown) that may enable controller 110 to read received signals and to issue control commands. Controller 110 may be configured to control one or more of liquid tank 116, heat exchanger 119, passenger's cabin 120, driver's seat 130, pump 115, and main battery 140 to operate according to embodiments of the present invention.

In some embodiments, systems 10 and 100 may each include an additional controller. The additional controller or controllers 22 and 110 may control the operation of heating elements 18 or 118 and/or pumps 15 or 115. The additional controller or controllers 22 and 110 may further control one or more valves configure to control the flow of the heated liquid or heated electrolyte to heat one or more components of the electric vehicle (e.g., main battery 12 or 140, passengers' cabin 20 or 120 and driver's seat 130). The additional controller or controllers 22 and 110 may control the liquid or electrolyte flow rate in various pipes included in the system according to a desired temperature at each of the components. The additional controller or controllers 10 and 110 may further control the operation of the heating element, to heat and maintain the temperature of the liquid or the electrolyte in the tank at the desired temperature.

In some embodiments, the desired temperature may be received from a user or may be determined based on the surrounding temperature, measured by a vehicle's thermometer. In some embodiments, the desired temperature and/or the flow rate of the liquid or the electrolyte may be determined based on information regarding a foreseen temperature received, for example, from a weather forecast. The information may be received by the controller via wireless communication. In some embodiments, the desired temperature may be between 30-130° C., 55-95° C., at least 30° C., at least 55° C. or more.

Some embodiments of the invention may be related to a service station for supplying a heated heat accumulating liquid or a heated electrolyte to an electric vehicle. The electric vehicle may be powered by a battery (e.g., battery 12) and/or include a metal air battery (e.g., battery 14). The service station may include a first tank for holding a heated heat accumulating liquid (e.g., liquid 116) or a heated fresh electrolyte (e.g., electrolyte 16). A heating element any be located inside the first tank to heat the heat accumulating liquid or electrolyte to a desired temperature, for example, a temperature between 30-130° C., 55-95° C. or the like. In some embodiments, a thermometer may be located inside the first tank to measure the temperature of the heat accumulating liquid or the heated electrolyte.

In some embodiments, the service station may further include a second tank for holding a used heat accumulating liquid or a used electrolyte. In some embodiments, the service station may further include a controller configured to control the replacement of the used heat accumulating liquid or the used electrolyte with the heated heat accumulating liquid or heated electrolyte. In some embodiments, the controller may further control the heating element to heat the liquid held in the first tank to the desired temperature according to reading received from the thermometer.

In some embodiments, the service satation may further include a connector to be connected to the electric vehicle for replacing the used heat accumulating liquid or the used electrolyte in the electric vehicle with the heated heat accumulating liquid or the heated electrolyte. In some embodiments, the service station may include a pump or any other pumping system for pumping the used liquid or used electrolyte from the vehicle's tank (e.g., tank 17 or tank 117) via the connector to the second tank and further to pump the heated liquid from the first tank to be inserted into the vehicle's tank via the connector. The pump or pumping system may be controlled by the controller. The service station may be stationary or mobile. The service satation may serve more than one vehicle or more than one metal-air batteries included in a single vehicle, simultaneously. When an electric vehicle enters the service station, or when the service station reaches the electric vehicle, the replacement system may be connected to the service station via the connector.

Figure 2A:
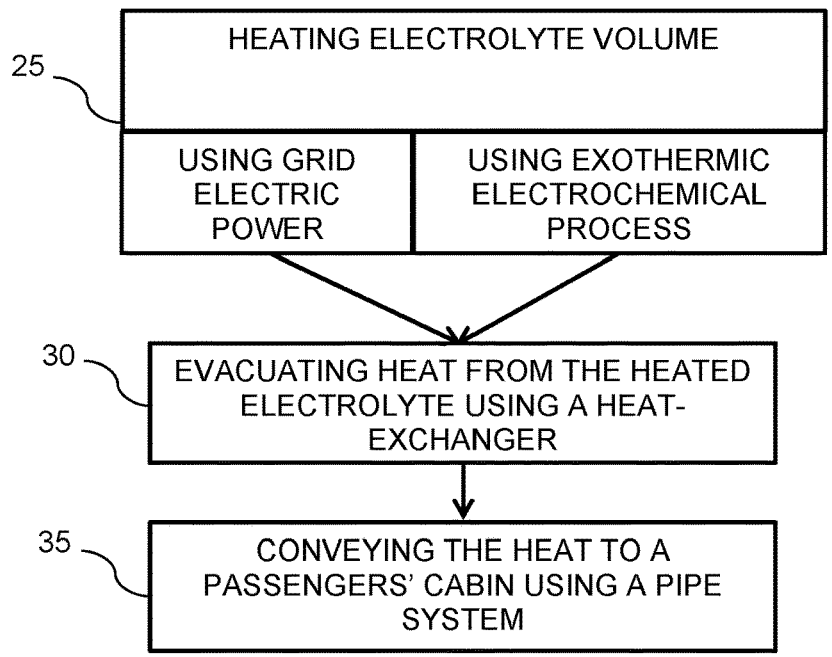
FIG. 2A is a flowchart of a method of heating a component of an electric car according to some embodiments of the present invention.

Reference is now made to FIG. 2A, which is a flowchart depicting a method of heating a component in an electric vehicle, for example, passengers' cabin according to some embodiments of the invention. The electric vehicle may be powered by a main battery (e.g., battery 12) such as a lithium-based battery, and a supplementary metal-air battery (e.g., battery 14) such that the metal-air battery may provide electrical power to the main battery when needed, for example when its capacity drops below a definable threshold value for extending the travel range of the electric vehicle.

In block 25, the method may include heating a reservoir tank comprising electrolyte volume usable in the metal-air battery. The electrolyte in the tank may be heated to a desired temperature, for example, above 70° C. In some embodiments, heating the reservoir tank may be done by powering a heating element located in the reservoir tank or in proximity to the reservoir tank or near the electrolyte piping system. The heating element may be powered from an external electric source, for example, an electric grid. In some embodiments, the heating element may be powered during charging of the main battery from an external electric source, for example, the electric grid, when the electric vehicle is parking. In some embodiments, the method may include activating the metal-air battery for charging the main battery during voyage of the electric vehicle, when the capacity of the main battery is below a predetermined threshold value. During the operation of the metal-air battery, the electrolyte in the tank reservoir tank may be heated by an exothermic reaction takes place in the air-metal battery.

In block 30, the method may include evacuating heat from the heated electrolyte using a heat-exchanger, for example, heat exchanger 19. In block 35, the method may include conveying the heat to the passengers' cabin using a pipe system, for example, a pipe system included in heat exchanger 19, the heat may be conveyable to the passenger's cabin, for example, cabin 20.

Figure 2B:
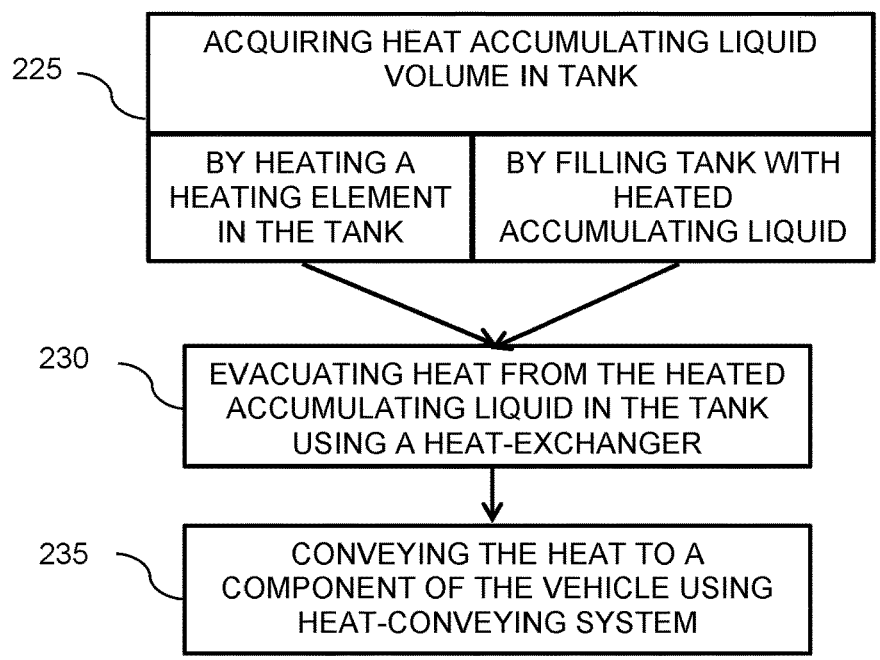
FIG. 2B is a flowchart of a method of heating one or more components in an electric car according to some embodiments of the present invention.

Reference is now made to FIG. 2B which is a flowchart depicting a method of heating a component in an electric vehicle according to some embodiments of the invention. The motor of the electric vehicle is being powered by a main battery (e.g., battery 140 or 12). In block 225, the method may include acquiring heat accumulating liquid, the accumulating liquid may heated to a desired temperature, for example, to 50° C.-90° C. The heat accumulating liquid may be held in a tank included in the electric vehicle. In some embodiments, acquiring heat accumulating liquid may include heating the heat accumulating liquid in the tank using a heating element powered by an electric source external to the electric vehicle, for example, the electric grid.

In some embodiments, acquiring heat accumulating liquid may include filling a heated heat accumulating liquid from an external reservoir, external to the electric vehicle, for example, a reservoir located in a filling station (e.g., a gasoline/service station). The electric car may stop at the station and the heat accumulating liquid currently in the tank may be replaced with a new heat accumulating liquid heated to a desired temperature. The heat accumulating liquid may be replaced when the temperature of the heat accumulating liquid currently in the tank, drops below a predetermined threshold value, for example, below 30° C.

In block 230, the method may include evacuating heat from the heated heat accumulating liquid using a heat-exchanger, for example, heat exchanger 19 or 119. In block 235, the method may include conveying the heat to at least one component included in the electric vehicle. The at least one component may be the passengers' cabin, the driver's seat and/or the main battery.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A system for heating a component in an electric vehicle, the vehicle is primarily powered by a main battery, said system comprising:
    a supplementary battery being metal-air battery comprising an electrolyte;
    a reservoir tank for holding electrolyte volume for the metal-air battery, the electrolyte volume usable as a thermal battery for preserving heat;
    a heating element powered by an external electric source, for heating the electrolyte in said reservoir tank before the electric vehicle is started; and
    a heat exchanger for conveying heat from the electrolyte, said heat being conveyable to said component.

2. A system according to claim 1, wherein the external electric source is external to the metal-air battery.

3. A system according to claim 1, wherein the heating element is powered during charging of the main battery by an electric source external to the electric vehicle.

4. A system according to claim 1, wherein the electrolyte is circulable between the metal-air battery and the reservoir tank and heatable during the operation of the metal-air battery due to an exothermic reaction takes place in the metal-air battery.

5. A system according to claim 1, wherein the electrolyte is heated to a desired temperature.

6. A system according to claim 1, wherein the metal-air battery is an aluminum-air battery.

7. A system according to claim 1, wherein the metal-air battery is electrically coupled to the main battery and activated to recharge the main battery of the electric vehicle.

8. A system according to claim 1, further comprising a replacement system to replace the electrolyte when the temperature of the electrolyte currently in the tank, drops below a predetermined threshold value.

9. A system according to claim 1, wherein the component of said electric vehicle is a passengers' cabin.

10. A system according to claim 1, wherein the component of said electric vehicle is said main battery.

11. A system according to claim 1, wherein the component of said electric vehicle is a driver's seat.

12. A method of heating a component in an electric vehicle comprising a main battery, the method comprising:

heating a reservoir tank comprising electrolyte volume usable in a metal-air battery included in the electric vehicle;

providing a heating element powered by an external electric source for heating the electrolyte in said reservoir tank before the electric vehicle is started, wherein the electrolyte volume is usable as a thermal battery for preserving heat and wherein the metal-air battery is configured for providing electrical power to said main battery;

evacuating heat from the heated electrolyte using a heat-exchanger; and conveying the heat to the component in the electric vehicle.

13. A method according to claim 12, wherein the external electric source is external to the metal-air battery.

14. A method according to claim 13, wherein powering the heating element is during charging of the main battery from an electric source external to the electric vehicle.

15. A method according to claim 12, wherein heating the reservoir tank is by an exothermic reaction that takes place in the air-metal battery during an operation of the metal-air battery.

16. A method according to claim 12, wherein the electrolyte is heated to a desired temperature.

17. A method according to claim 12, wherein the metal-air battery is an aluminum-air battery.

18. A method according claim 12, further comprising:

activating the metal-air battery for charging the main battery, and extending the travel range of the electric vehicle.

* * * * *